(12) United States Patent
Feussahrens et al.

(10) Patent No.: US 7,575,268 B2
(45) Date of Patent: Aug. 18, 2009

(54) COMPONENT OF AN ADJUSTING MECHANISM FOR A CONVERTIBLE MOTOR VEHICLE ROOF

(75) Inventors: Heino Feussahrens, Wagenfeld (DE); Hans-Joachim Emmelmann, Osnabruck (DE); Winfried Bunsmann, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 200 days.

(21) Appl. No.: 10/596,606

(22) PCT Filed: Dec. 15, 2004

(86) PCT No.: PCT/DE2004/002744

§ 371 (c)(1),
(2), (4) Date: Nov. 1, 2006

(87) PCT Pub. No.: WO2005/058627

PCT Pub. Date: Jun. 30, 2005

(65) Prior Publication Data

US 2007/0132270 A1    Jun. 14, 2007

(30) Foreign Application Priority Data

Dec. 19, 2003   (DE) .............................. 103 60 588

(51) Int. Cl.
*B60J 7/00* (2006.01)
(52) U.S. Cl. ................................. 296/107.01
(58) Field of Classification Search ............ 296/107.01, 296/120.1, 123, 210
See application file for complete search history.

(56) References Cited

U.S. PATENT DOCUMENTS 5,829,821 A * 11/1998 Aydt et al. ................... 296/122
6,428,090 B1 * 8/2002 Reinsch .................. 296/216.08

FOREIGN PATENT DOCUMENTS

| DE | 10134439 A1 | * | 2/2003 |
| EP | 1046528 A | | 10/2000 |
| EP | 1046528 A1 | * | 10/2000 |

* cited by examiner

*Primary Examiner*—H Gutman
(74) *Attorney, Agent, or Firm*—Quinn Law Group, PLLC; Christopher W. Quinn

(57) ABSTRACT

A component of an adjustment mechanism for a vehicle roof of a convertible, designed to be adjustable between a first position and a second position, which is exposed to alternating loads as a function of its position and is topologically and/or topographically adjusted to the loads acting on component for a predefined design space, so that a uniform stress distribution is at least approximately present in component, at least in critical load situations, and the component is designed in the areas with limited load with less use of material than in the areas with higher load, or with a recess.

6 Claims, 3 Drawing Sheets

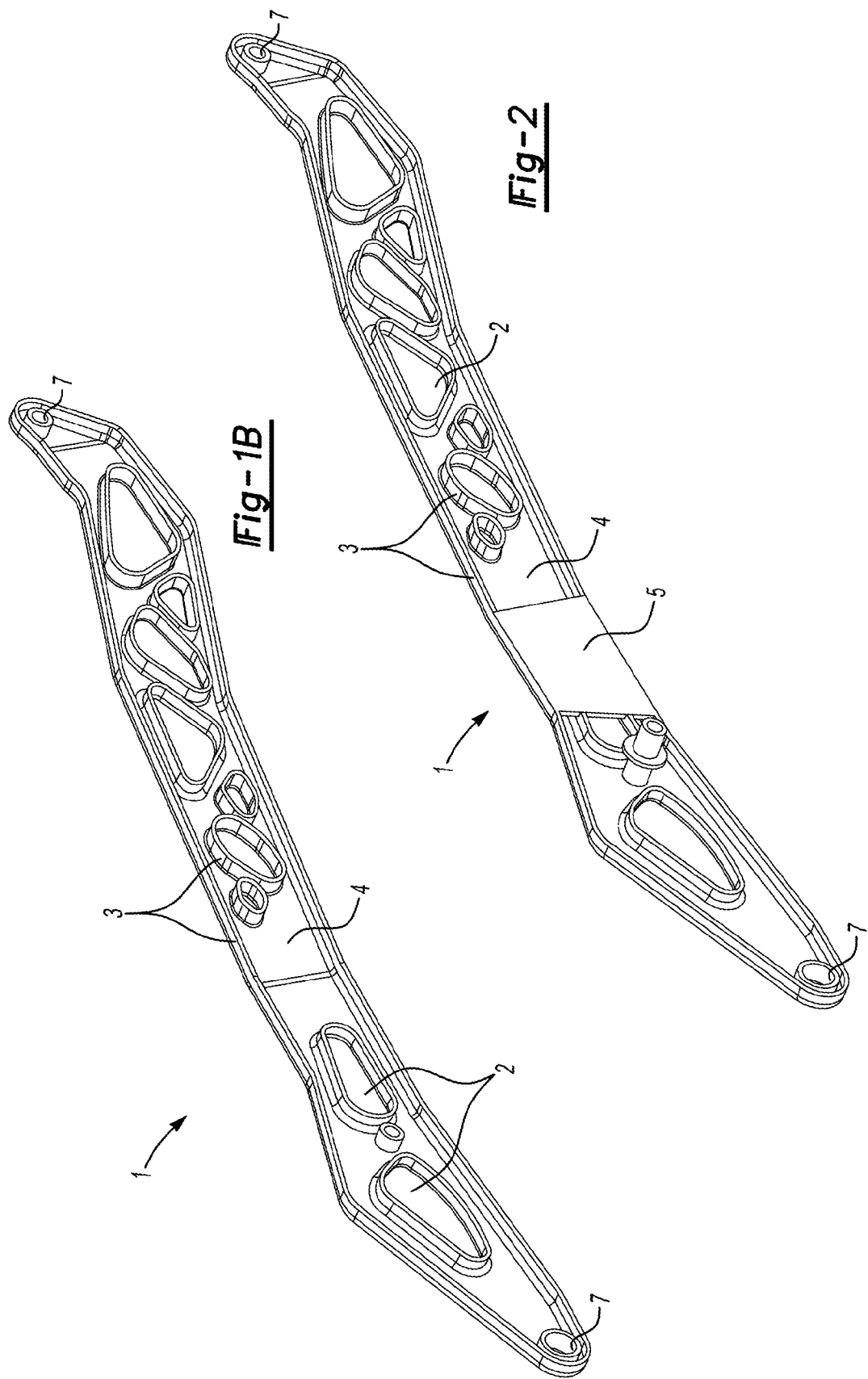

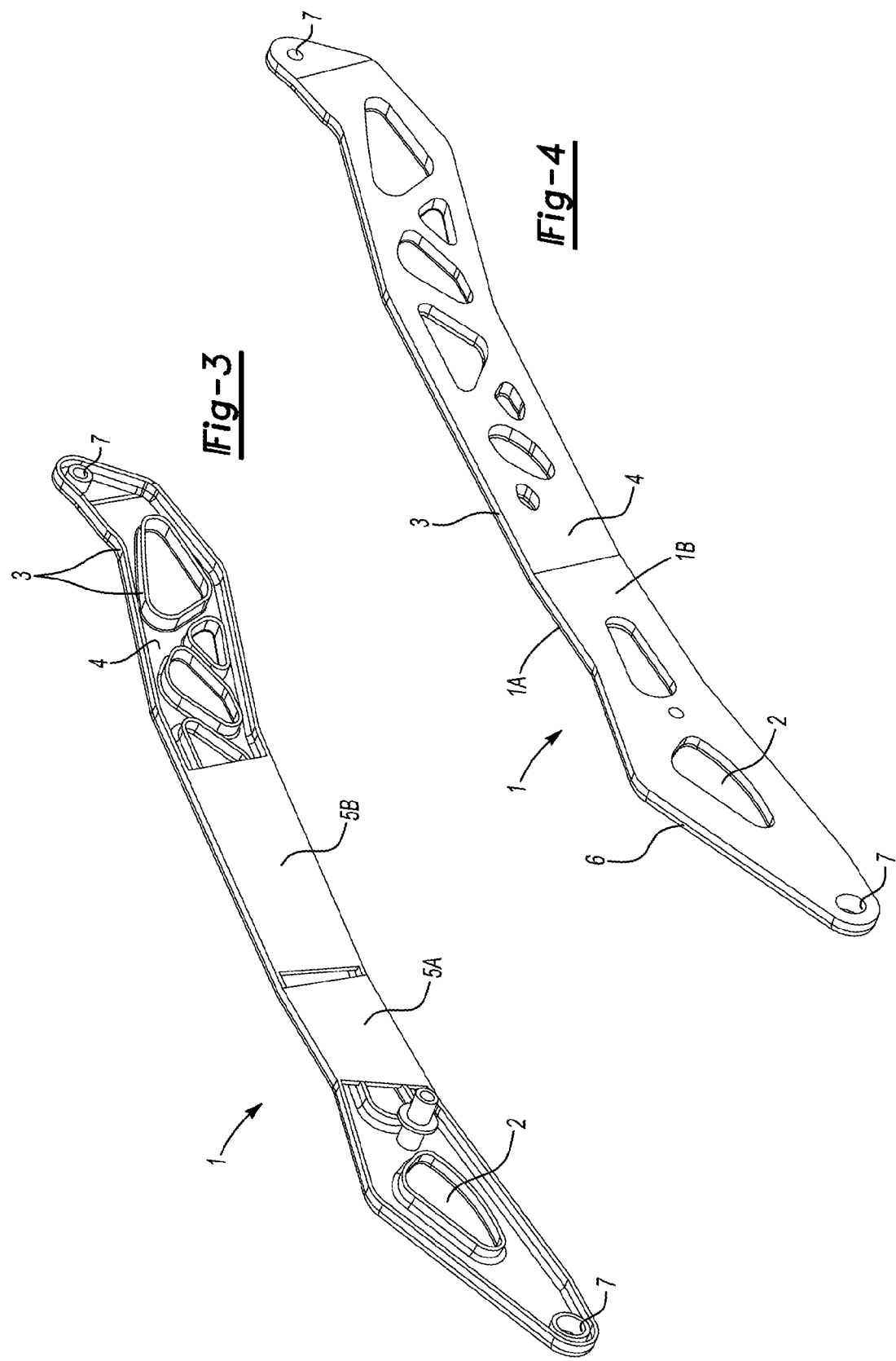

COMPONENT OF AN ADJUSTING MECHANISM FOR A CONVERTIBLE MOTOR VEHICLE ROOF

CROSS-REFERENCE TO RELATED APPLICATION(S)

This application is a US National Phase of International Application No. PCT/DE 2004/002744, filed Dec. 15, 2004, which claims priority to German 103 60 588.6, filed Dec. 19, 2003. The entire contents of the above identified applications are incorporated herein by reference.

TECHNICAL FIELD

The invention relates to a component of an adjustment mechanism for a vehicle roof of a convertible, designed to be adjustable between a first position and a second position.

BACKGROUND OF THE INVENTION

Adjustment mechanisms, known from vehicle roofs of convertibles, have rods whose individual rod parts are articulated at various articulation points and are subject to certain configuration requirements, due to the space available for the rod kinematics. Various forces and moments are introduced to the individual rod parts at the articulation points, depending on a current load situation.

High loads act on the rod parts in the closed state, in the opened or fully retracted state of a vehicle roof of the convertible, and in positions of the vehicle roof between these two positions that represent critical load situations for the rod parts, due to unfavorable lever ratios, so that high requirements are imposed on the strength of the rod parts. The rod parts used thus far are designed as full-cross-section steel-stamped and bent parts or forged parts, as full-cross-section injection-molded parts from fiber-reinforced plastic, or as hollow-cross-section parts from preformed (like bent or stamped and then welded) steel sheets.

The rod parts designed in the manner described are known to be characterized by an unfavorable component weight-rigidity ratio and cause undesirably high manufacturing costs.

A pivotable rod for a vehicle roof capable of opening and a method for production of such a rod by interior pressure shaping from a hollow semifinished product are known from DE 101 34 439 A1, which rods can be produced with a more favorable component weight-rigidity ratio compared to the above-mentioned rod parts.

A disadvantage in this case, however, is that component shaping by the interior pressure-shaping method adapted to the corresponding application and carried out according to load cannot be performed arbitrarily, since component shaping can only be carried out with a draw ratio of up to 20%.

In addition, in components produced by the interior pressure shaping proposed from the state of the art, joining of additional parts to the already shaped components can only be accomplished with increased manufacturing expense, since, under some circumstances, they cannot be carried out with cost-effective spot-welding methods, but with more demanding and more cost-intensive welding methods, in which the joints being attached are attached to the rod parts by welds positioned on the edges. This results from the fact that the welding tongs required in spot-welding methods cannot be arranged in the positions required for the spot-welding process, due to the rod parts in small diameter ranges designed with a closed component cross-section.

SUMMARY OF THE INVENTION

The underlying task of the present invention is to provide a component of an adjustment mechanism (or kinematic mechanism) for a vehicle roof of a convertible designed to be adjustable, which can be produced both cost-effectively and with a favorable component weight-rigidity ratio.

This task is solved according to the invention with a component according to the characteristics described below.

The component of an adjustment mechanism according to the invention, for a convertible vehicle roof, designed to be adjustable between a first position and a second position, which is exposed to alternating loads as a function of its position, is characterized by a favorable component weight-rigidity ratio, since it is adapted for a design space topologically and/or topographically predefined to the loads acting on the component, so that an at least approximately uniform stress distribution is present in the component, at least in critical load situations, and the component, in areas with limited load, is designed with lower use of material than in areas with higher load, or with a recess.

This means that the configuration of the component is designed according to load, so that the component, in all areas, is made at least approximately only with material required to be used in the corresponding area, and with which the admissible stresses and deformations lie in the admissible tolerance range. Such a configuration of a component, optimized with respect to component weight-rigidity ratio as a function of critical load situations, cannot be accomplished with the method proposed in DE 101 34 439 A1 for a predefined design space, due to the limited draw ratio.

A component designed according to the invention therefore has an improved component weight-rigidity ratio in comparison to a component produced by the interior pressure shaping method and a component of an adjustment mechanism of a convertible vehicle roof designed in the usual way, since the employed material is optimally distributed, depending on the corresponding application, in an available design space or in a predefined design space.

A component designed according to the invention can be produced with traditional cost-effective production methods, like punching, bending, casting, milling, or the like, since any component contours with varying component and wall thicknesses can be produced with these production methods, which cannot be accomplished by the interior pressure shaping method.

For example, a possibility exists of designing a component according to the invention as a single part produced by sheet deformation, which is preferably formed at least in some areas with an open profile, and is designed with a topology and/or topography adapted to the applied loads.

In addition, a possibility also exists of producing the component from several individual parts joined to each other, preferably welded to each other, and designed at least in some areas with an open profile, which, in the joined state, form a closed profile, at least in some areas, in which each of the individual parts is designed with a topology and/or topography adapted to the applied loads.

Additional advantages and advantageous further developments of the invention can be seen in the patent claims, with reference to the practical examples described in the drawings.

BRIEF DESCRIPTION OF THE DRAWINGS

In the drawings:

FIG. 1B shows a first practical example of a component designed according to the invention, which is made with several recesses in areas with limited load;

FIG. 2 shows the component shown in FIG. 1, which is made with a reinforcing element in the area of one recess;

FIG. 3 shows the component shown in FIG. 1 with two reinforcing elements; and

FIG. 4 shows the component designed according to the invention and shown in FIG. 1, which is produced from two individual parts as a sheet part.

DESCRIPTION OF THE PREFERRED EMBODIMENTS

Figure 1A:
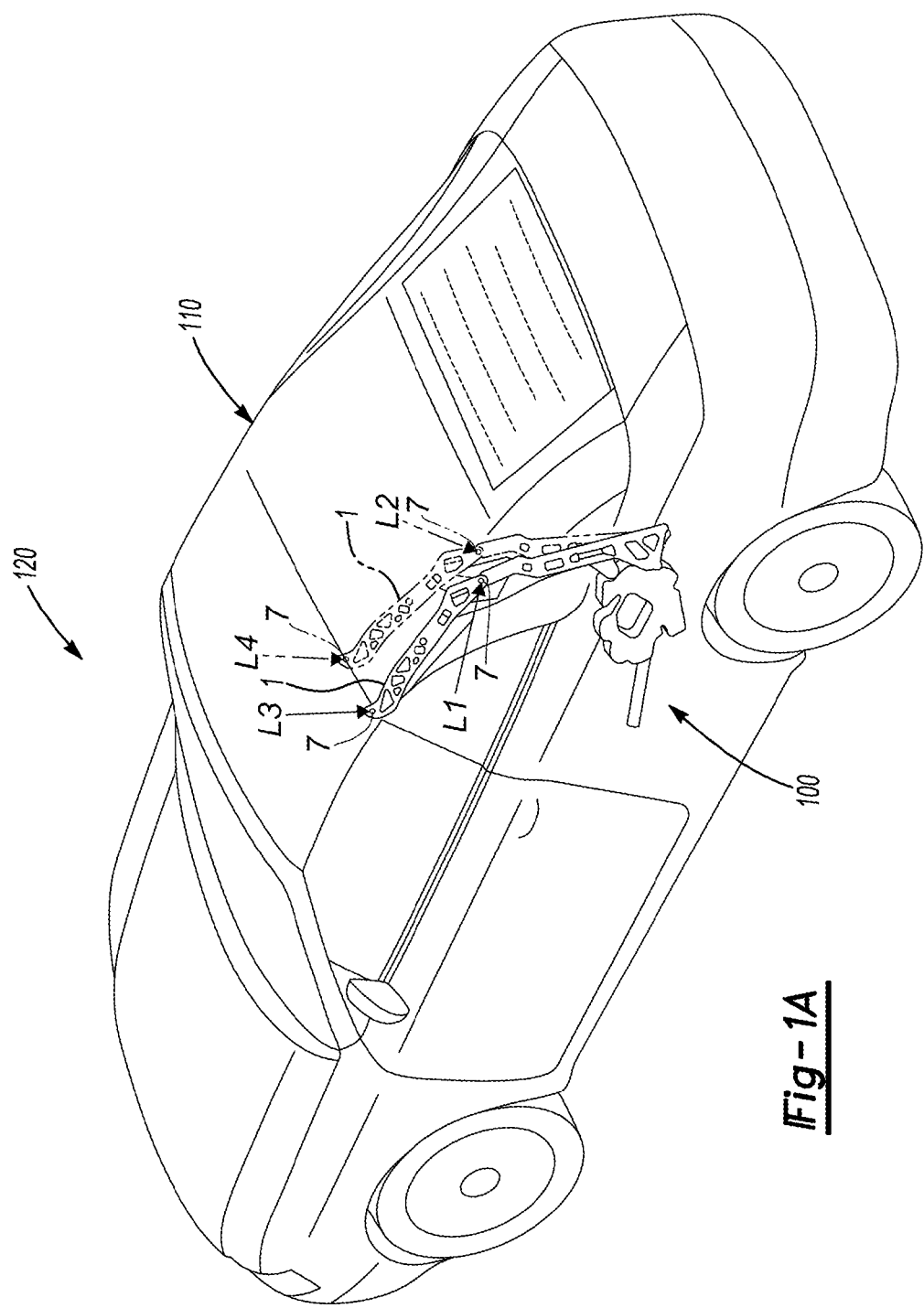
FIG. 1A schematically illustrates a convertible vehicle including a known adjustment mechanism having a component designed according to one embodiment of the present invention.

Referring to FIG. 1A, a component 1 of a known adjustment mechanism 100 for a vehicle roof 110 of a convertible vehicle 120, made to be adjustable between a first position and a second position, as illustrated, is shown.

Referring to FIG. 1B, the component 1 or the rod part is producte by a sheet-deformation method and has flange edges 3, both in the region of its outer contour and in the region of several recesses 2, whereby the flange edges 3 are each provided as reinforcement parts of the component 1.

The component 1 of the adjustment mechanism is moved during opening or closing of the vehicle roof and transfers the forces originating from the drive between the vehicle roof and the vehicle body of the convertible, in which it can be driven either with a motor, by means of a drive device, or manually, by an operator.

According to the invention, the highest loads in convertibles are introduced into the adjustment mechanism or into the adjustment rods of the vehicle roof, both in the completely closed roof, and also in the retracted state of the vehicle roof, because of unfavorable lever ratios, so that these operating states of the adjustment mechanism represent the load situations or critical loads relevant for strength calculation of the individual components of the adjustment mechanism. Moreover, critical load situations, because of unfavorable lever ratios, can also occur in different positions of a vehicle roof between the two above-mentioned end positions during its opening phase or a closing phase, which are considered during dimensioning of the rod parts of an adjustment mechanism.

This means that the loads occurring during the critical load situations are used for configuration of the component 1 according to load, i.e., to optimize the topology and also to optimize the topography of the component 1 by means of numerical calculation methods.

In this case, two-dimensional line kinematics are initially developed by means of two-dimensional rod parts during so-called kinematic development, with consideration of available design space and, under some circumstances, also design stipulations. A collision-free arrangement of the rod parts and kinematics are also determined in connection with this by means of three-dimensional rod parts.

By means of the determined kinematics of the three-dimensional rod parts, during multi-element simulation analysis, the forces occurring in the three-dimensional rod parts are determined for predefined or critical load situations, from which both the resulting forces and the resulting moments at the articulation points are determined between the individual three-dimensional rod parts. With these boundary conditions determined for the predefined load states of the adjustment mechanism of the vehicle roof of the convertible, by means of appropriate calculation methods, which are conducted with known program algorithms, a topology optimization and/or a topography optimization of the individual rod parts, in the present case of component 1, are carried out, with which the components of an adjustment mechanism with shape-optimized geometries as a function of the predefined load situations and with a favorable component weight-rigidity ratio are made available.

The component 1 shown in FIGS. 1A and 1B is designed in the areas with limited load, determined during multi-element (or finite element) simulation analysis for the critical load situations, with recesses 2 for weight reduction, in which the component 1, in the areas with higher load L1, L2, L3, L4, like in the area of articulation point 7, is configured with walls 4 and flange edges 3. The component, designed as a steel sheet part, in comparison to a rod part made from solid material, represents a significantly lighter version of a rod part of an adjustment mechanism of a vehicle roof that has a uniform stress distribution over the entire component structure for the critical load situations considered during weight optimization.

The component 1 shown in FIG. 1B is designed in the areas with limited load, determined during multi-element (or finite element) simulation analysis for the critical load situations, with recesses 2 for weight reduction, in which the component 1, in the areas with higher load, like in the area of articulation point 7, is configured with walls 4 and flange edges 3. The component, designed as a steel sheet part, in comparison to a rod part made from a solid material, represents a significantly lighter version of a rod part of an adjustment mechanism of a vehicle roof that has a uniform stress distribution over the entire component structure for the critical load situations being considered during weight optimization.

If the component 1 shown in FIG. 1B is not supposed to have the desired strength in certain load states, there is the possibility of designing the component 1 with respect to strength of under-dimensioned cross-sectional areas with reinforcement parts 5 or 5A and 5B, shown in FIG. 2 and FIG. 3. Reinforcement parts 5A and 5B are firmly connected to the flange edges of component 1, preferably by welding, gluing or the like.

The component 1 shown in FIG. 4 represents a modification, with reference to the variants of the component according to FIG. 1B to FIG. 3, in that it is designed in cross-section as a hollow profile, formed from two individual parts 1A and 1B, each of which corresponds to the component 1 shown in FIG. 1B and are welded to each other in the area of flange edges 3 in a contact area 6. The component formed in this way, according to FIG. 4, in comparison to a rod part made of solid material, has a much more favorable component weight-rigidity ratio.

In addition to or as an alternative to the variants shown in FIG. 1B to FIG. 4, it can also be envisioned in other practical examples (not further shown) of the component according to the invention that the component 1 or individual parts 1A and 1B be formed in the areas with limited load only with less use of material or with smaller wall thicknesses than in the areas with higher loads. Because of this, on the one hand, a weight reduction is achieved in comparison to components produced from solid material with equivalent wall thickness and, at the same time, higher rigidity is achieved in comparison to components designed with recesses.

This procedure represents a compromise between the weight optimization being strived for and the rigidity of the component of an adjustment mechanism required because of the critical load situations, which leads to a weight saving in comparison to the traditionally designed components of adjustment mechanisms, with consideration of the corresponding application.

In addition, a possibility also certainly exists of designing a component made according to the invention, which is optimized topologically and/or topographically with respect to its component weight and the component loads, at least for critical load states, as a cast part or a milled part, preferably consisting of an aluminum or magnesium alloy.

The practical examples of the component according to the invention shown in the drawing merely represent highly schematized component structures, optimized with respect to component weight and component load for a predefined design space, which are designed over their component length with a different cross-sectional configuration adapted as a function of the load situations considered during weight optimization.

The components 1 can also be designed to improve the component weight-rigidity ratio at an appropriate site in all areas with stiffening beads, flat spots, and embossings.

While the best modes for carrying out the invention have been described in detail, those familiar with the art to which this invention relates will recognize various alternative designs and embodiments for practicing the invention within the scope of the appended claims.

REFERENCE NUMBERS

1 Component
1A, 1B Individual part
2 Recess
3 Flange edge
4 Walls
5 Reinforcing part
5A, 5B Reinforcing part
6 Joint
7 Articulation point

The invention claimed is:

1. A component of an adjustment mechanism for a vehicle roof of a convertible vehicle, wherein the component includes:
    a recess and a flange edge surrounding the recess, wherein the recess and the flange edge surrounding the recess are located in a limited load area of the component;
    wherein the component is adjustable between a first position and a second position and the component is exposed to alternating loads as a function of the position;
    wherein the component is topologically and topographically designed for the alternating loads acting on the component for a predefined design space, such that a uniform stress distribution is at least approximately present in the component at least during critical load situations;
    wherein the component is a sheet-metal part having an open profile produced by a sheet deformation process.

2. A component according to claim 1,
including a reinforcing part arranged in an area of a recess.

3. A component according to claim 1,
including a reinforcing part that is designed, at least partially, as an element firmly connected to a wall of the component.

4. A component according to claim 1,
wherein the sheet-metal part is produced from steel.

5. A component according to claim 1,
wherein the sheet-metal part is produced from two or more individual parts connected to one another.

6. A component according to claim 5,
wherein the component includes several individual parts connected to one another to form a closed profile, at least in some areas,
wherein each of the several individual parts are designed to be topologically and topographically adapted to the alternating loads acting on the component; and
wherein the several individual parts are connected to one another via welding.

* * * * *